Patented Dec. 8, 1925.

1,564,501

UNITED STATES PATENT OFFICE.

JAMES W. WEIR, OF FILLMORE, CALIFORNIA, ASSIGNOR OF ONE-HALF TO JOHN C. BLACK, OF DESTREHAN, LOUISIANA.

METHOD OF MANUFACTURING LUBRICATING OILS.

No Drawing.     Application filed March 21, 1922. Serial No. 545,538.

*To all whom it may concern:*

Be it known that I, JAMES W. WEIR, a citizen of the United States, residing at Fillmore, in the county of Ventura, State of California, have invented certain new and useful Improvements in Methods of Manufacturing Lubricating Oils, of which the following is a specification.

The usual, accepted and generally accepted method or process of treating oils for the production of the desired light colored lubricating oil resides essentially in the following steps in substantially the order given. The oil to be treated, heated to a temperature for proper fluidity—dependent on the character of the oil employed—which is usually 60° to 80° F., is first in proper quantity agitated in the presence of sulphuric acid for a given period and permitted to settle and the sludge produced by the acid reaction withdrawn; the oil is then subjected to a second agitation or spraying with a suitable neutralizing agent, for instance sodium hydroxide solution, and permitted to settle, and a withdrawal of the waste alkali and possible products of reaction takes place; a washing by agitation or spraying with water is then resorted to until the oil is free of the alkali, and the settling and withdrawal of the waste water follows; the oil is then heated and air blown therethrough until the same is free or substantially free of all moisture, and finally the oil is treated by filtration with a decolorizing agent by being passed through a filter bed or medium consisting of mineral earth, usually fuller's earth. This constitutes a somewhat slow and expensive method of treatment.

The foregoing five described steps of operation followed in the order given constitute what is known as a single cycle operation and is representative of the method generally followed by manufacturers of lubricating oil, each manufacturer varying the quantity of the sulphuric acid and neutralizing agent employed as desired, equally so the time period of treatment.

The objects of the present invention are to facilitate or expedite the operation or period of treatment of the oil; to materially reduce the expense incident to the manufacture of lubricating oils, and to produce an oil considerably enhanced in appearance over the lubricating oils as produced under the present accepted methods resorted to for the production thereof.

By practical experimentation, I have discovered that the alkali treatment heretofore resorted to and which follows the treatment with the sulphuric acid, may be eliminated; also, the step of the method resorted to and known as the "washing" of the oil may be discarded; that the drying step may be disposed of, and further, the bleaching step by filtration as an independent step of the present method of treatment may be disposed of. In other words, of the five steps previously referred to in the manufacture of lubricating oils, at least three thereof are disposed of by the present invention and the expense incident thereto saved thus by such savings lowering the cost incident to the production of such oils and reducing the time period of operation.

By the expression "normal" temperature as hereinafter employed is meant and wished to be understood as the temperature of the oil for proper fluidity, which varies slightly with different grades of oils to be treated. Ordinarily, this temperature is approximately 60° F. to 80° F., which is usually raised to approximately 75° F. to 100° F., by the action of the acid employed during treatment. Therefore, by "normal" temperature of the oil is to be understood that temperature at which the oil is usually treated and slightly above the initial temperature thereof for proper fluidity and which for the purposes of the present invention shall be assumed as a temperature of approximately 90° F.

In the carrying out of my method invention, the first step heretofore employed in the manufacture of lubricating oils is resorted to; that is to say, the oil at temperature for fluidity is subjected to agitation in the presence of mineral acid, such for instance as sulphuric acid and hydrochloric acid, employed for a separation by the reaction with the objectionable hydrocarbon contents thereof, which after settlement in the oil are drawn off in the form of "sludge." Contrary to the usual method of transferring the oil so treated for treatment by agitation or spraying with a neutralizing agent, such for instance as sodium hydroxide solution, I transfer the oil with the major portion of the "sludge" withdrawn therefrom into a suitable vessel where the oil is subjected to agitation in the presence of finely divided or comminuted mineral earth, such for instance as colloidal clay, bauxite, montmorillonite, pyrophyllite, fuller's earth and kindred substances, in predetermined quantities preferably insufficient to fully neutralize or remove the total acid reaction products in the oil, and in consequent materially smaller quantities than is the general practice, and sufficient only to remove the free acid and suspended sludge but not the acid reaction product sulphur dioxide ($SO_2$) physically contained in the oil or acid reaction products forming $SO_2$ by decomposition, contained therein. At this period of my treatment the temperature of the oil is raised considerably in excess of its normal flow temperature, which increased temperature liberates and distills off the $SO_2$ remaining in the oil and completes the neutralization process. The temperature of the oil during this step of the operation is increased from its normal flow temperature of 80° to 100°F. to 180° to 350° F. during mechanical agitation, with or without the use of air, any inert gas such as $CO_2$, or steam, such treatment of agitation and heating being carried on until all odors of $SO_2$ have disappeared and the oil is found to be neutral by the common titration method. I find that while heat and mechanical agitation alone will remove the $SO_2$ the process may be expedited by the use of air, any inert gas such as $CO_2$, or steam.

By heating the mixture of absorbent material and stock to the temperature stated the suspended sludge that remains in the oil after such sludge as will settle out of the oil is removed is caused to break down into sulfur dioxide and other constituents. The other constituents of the suspended sludge remaining in the mixture upon the liberation of the sulfur dioxide are absorbed by the absorbent material and prevented from going into solution in the oil.

The oil is then carried to any suitable form of mechanism or means for the extraction, separation or removal of the mineral earth therefrom or such products of reaction produced by the intermixture of the said mineral earth with the oil through its period of agitation and heating.

While preference is given to the heating of the oil during the period of the agitation and intermixture therewith of the mineral earth, it will be understood that the said heating or increasing of the temperature of the oil may in excess of its normal flow temperature be carried on after the oil has been removed from the agitating and mixing vessel, but I have found that the work is expedited by carrying out a heating of the oil during the intermixing of the mineral earth therewith.

As another item of saving, attention is directed to the fact that where ordinarily one ton of mineral earth is employed in the known methods in the treatment of 2500 gallons of oil, under my method of treatment one ton of the same class or type of mineral earth will answer or serve for the treatment of approximately 5,000 gallons of oil, thereby making a material saving in the use of such material.

Ordinarily the colloidal clay or comminuted earth as heretofore employed is processed prior to use for purity, which renders the same somewhat expensive. Under my invention the mineral earth may be employed unprocessed, except as to being placed in a finely divided or powdered condition. However, bone black, charcoal and other substances of a like nature in a finely divided, powdered or comminuted form may be utilized as an equivalent of the mineral earth and such is to be understood as included in the term neutralizing agent.

I have discovered that the application of heat to the oil to materially increase its temperature above the normal flow temperature thereof during the neutralizing step thereof or immediately after the comminuted neutralizing substance has been added and intermixed therewith under agitation, promotes, aids and renders the neutralizing substance more active and efficient, it being understood that the amount of heat employed or the increased temperature given the oil in excess of its normal flow temperature will vary with or for the different grades and kinds of lubricating oils and equally so with the different kinds and grades of colloidal clay, fuller's earth or kindred substances used as the neutralizing agent—the range of temperatures varying from 180° to 350° F.

After the neutralizing of the oil the same is carried to any suitable means for the extraction and removal therefrom of the mineral earth or the neutralizing agent employed as well as the products of reaction produced by the intermixture of the said neutralizing agent with the acid treated oil.

The savings created by the use of the present invention comprises the elimination of the steps of the heretofore methods employed intermediate the sulphuric acid mixture step and the filtration step for the treated oil, whereby the expense of producing the lubricating oil is materially lowered and the time consumed in treatment reduced, while a further saving is made by reason of the fact that a greater quantity of oil may be treated with a given amount of mineral earth than heretofore; also a lesser amount of acid is necessary.

Having thus described the invention, what is claimed as new and desired to be protected by Letters Patent is:

1. The method of refining lubricating oil stocks, which comprises treating the oil with sulphuric acid, settling and removing the major portion of the sludge, then adding a comminuted solid absorbent material, heating the mixture to a temperature sufficient to decompose the remaining sludge and liberate sulphur dioxide therefrom, and separating the adsorbent material with the matters adsorbed thereon from the oil stock.

2. The method of refining lubricating oil stocks, which comprises treating the oil with sulphuric acid, settling and removing the major portion of the sludge, then adding a comminuted solid adsorbent material, heating the mixture above 180° F. to decompose the remaining sludge and liberate sulphur dioxide therefrom, and filtering the oil stock from the adsorbent material and matters adsorbed thereon.

3. The method of refining lubricating oil stocks, which comprises treating the oil with sulphuric acid, settling and removing the major portion of the sludge, then adding a comminuted solid adsorbent material, heating the mixture to a temperature sufficient to decompose the remaining sludge and liberate sulphur dioxide therefrom, blowing the mixture with a non-oxidizing gas during the said heating, and separating the adsorbent material with the matters adsorbed thereon from the oil stock.

In testimony whereof I have signed my name to this specification.

JAMES W. WEIR.